No. 616,095. Patented Dec. 20, 1898.
M. FOERG.
STEAM COOKER.
(Application filed July 12, 1898.)
(No Model.)
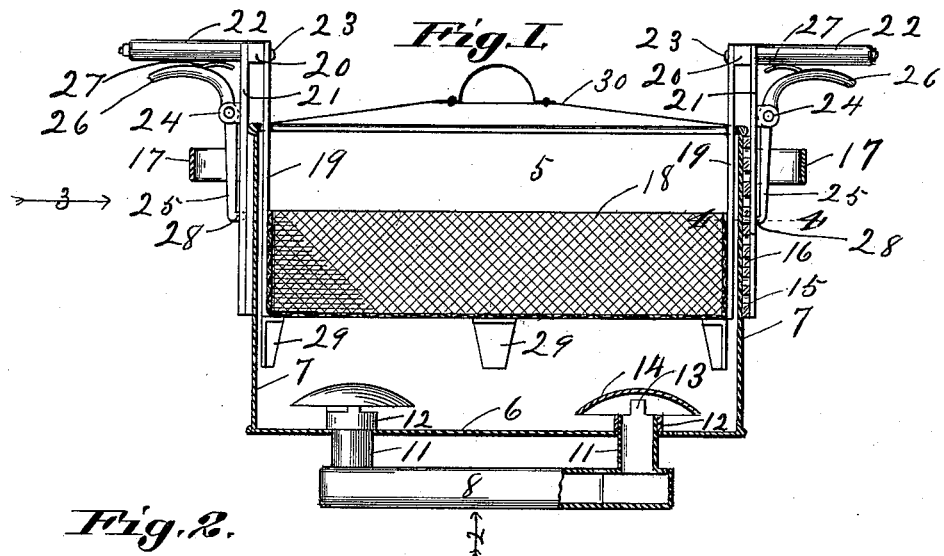
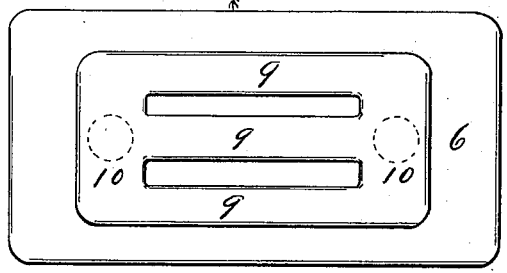
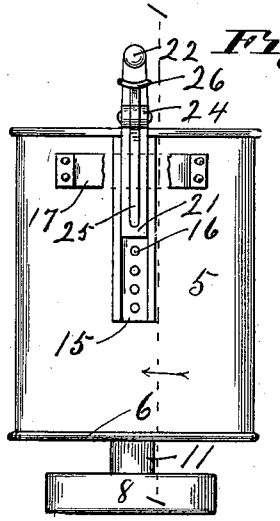
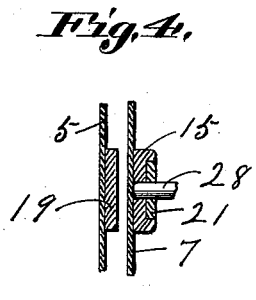
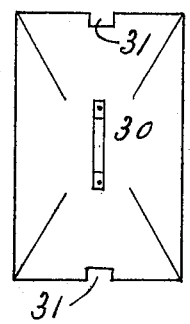
Attest:
Chilton L. Caldwell
Chas Fensky
Inventor:
Mathias Foerg,
By
Lemuel G. Wells,
Atty.

UNITED STATES PATENT OFFICE.

MATHIAS FOERG, OF ENTERPRISE, MISSISSIPPI.

STEAM-COOKER.

SPECIFICATION forming part of Letters Patent No. 616,095, dated December 20, 1898.

Application filed July 12, 1898. Serial No. 685,744. (No model.)

*To all whom it may concern:*

Be it known that I, MATHIAS FOERG, a citizen of the United States, residing in Enterprise, in the State of Mississippi, have invented an Improvement in Steam-Cookers, of which the following is a specification.

Figure 1 is a vertical longitudinal section of a steam-cooker constructed in accordance with the principles of my invention, said section being taken approximately on the line 1 1 of Fig. 3. Fig. 2 is a bottom plan view. Fig. 3 is an end view taken looking in the direction indicated by the arrow 3 in Fig. 1. Fig. 4 is a horizontal section in detail, taken approximately on the line 4 4 of Fig. 1, parts being broken away. Fig. 5 is a top plan view of the cover.

Referring by numerals to the drawings, the primary tank 5 is constructed of sheet metal and has a flat bottom 6. The walls 7 of the tank are vertical. The secondary tank 8 consists of three parallel tubular portions 9, having their ends connected together by the tubular portions 10, and short tubes 11 extend upwardly from the centers of the tubular portions 10 through the bottom 6. The rings 12 are placed around the upper ends of the tubes 11, above the bottom 6, and are attached to the bottom, and the tubes 11 are securely attached to the rings 12. The upper ends of the tubes 11 are some distance above the bottom 6. Arms 13 extend upwardly from the rings 12 and support the deflector-caps 14, said caps being concavo-convex disks placed in horizontal position with their convex sides upwardly. The channel-bars 15 are in vertical position at the centers of and attached to the ends of the tank 5, and openings 16 are formed through the centers of the channel-bars, said openings being approximately in vertical alinement. The U-shaped handles 17 are attached to the ends of the tank 5 and pass around the channel-bars 15.

The basket 18 is formed of suitable foraminous material, such as wire screen or perforated sheet metal, and is of such a size that it will readily pass downwardly into the tank 5. The arms 19 are attached to the ends of the basket 18 and extend vertically to positions above the tank 5, said arms being located in longitudinal alinement with the channel-bars 15. The blocks 20 are placed against the outer faces of the extreme upper ends of the arms 19, and the bars 21 are placed against the outer faces of the blocks 20 in longitudinal alinement with the arms 19 and in positions to slide downwardly in the channels of the bars 15. The handles 22 are placed against the opposite sides of the bars 21 in alinement with the blocks 20, and the bolts 23 are inserted through the arms 19, through the blocks 20, through the bars 21, and through the handles 22, as required to hold the parts together. The ears 24 project outwardly from the bars 21 a short distance below the handles 22, and the L-shaped levers 25 are pivoted to the ears 24, the upper ends 26 of said levers serving as handles and being located immediately below and substantially parallel with the handles 22. The springs 27 are attached to the handles 26 and engage the handles 22, the tension of said springs being exerted to press the handles 26 away from the handles 22. The pawls 28 are formed at the lower ends of the levers 25 by bending the material inwardly to substantially horizontal positions, and said pawls operate in the perforations 16 of the channel-bars 15, as required, to adjust the basket 18 up and down within the tank 5. The legs 29 are attached to the basket 18 and are of sufficient length to hold the basket from resting upon the caps 14 and also serve to support the basket when out of the tank.

The cover 30 is constructed to fit the tank 5, and has notches 31 in its ends to receive the arms 19. It is obvious that the basket may be adjusted up and down in the tank without moving the cover by manipulating the pawls 28 and that the basket 18 is rigidly held at any desired position within the tank regardless of the pressure of the steam or water.

The secondary tank 8 may be constructed of water-pipe or sheet-metal pipes or of any suitable material and is designed to present large surfaces to the action of the heat. The covers of the stove or heating apparatus are removed and the secondary tank 8 is placed in the stove with the bottom 6 of the primary tank resting upon the stove. The upper ends of the tubes 11 being somewhat above the bottom 6 will have a tendency to prevent the bottom 6 from becoming dry as long as there is water within the tank 8, because the steam will condense within the tank 5, and this condensation cannot run back into the tank 8 until it overflows the upper ends of the tubes 11. The deflector-caps 14 will catch the steam and hot water as it passes upwardly through the pipes 11 and spread it out over the bottom 6, and thus distribute it evenly to the basket 18. These deflectors will prevent the steam and water from shooting straight upwardly and scalding the operator when the basket is removed.

I claim—

1. In a steam-cooker, a primary tank, a basket mounted within the primary tank, arms extending upwardly from said basket, handles attached to and extending outwardly from said arms above the primary tank, channel-bars attached to the outer faces of the primary tank, bars extending downwardly from said handles within said channel-bars, and ratchet connections between said handles and said primary tank, whereby the basket may be adjusted up and down and held securely in position, substantially as specified.

2. In a steam-cooker, a primary tank, U-shaped handles attached to the ends of said tank, perforated channel-bars attached to the ends of said tank and extending through said handles, a basket mounted within the primary tank, arms extending upwardly from said basket, handles attached to and extending outwardly from said arms, bars extending downwardly from said handles and operating in said channel-bars, ears projecting outwardly from said bars, levers pivotally connected to said ears, pawls formed upon the lower ends of said pivoted levers, and engaging the perforations of said channel-bars, and spring-actuated handles formed upon the upper ends of said pivoted levers.

3. In a steam-cooker, a primary tank, a basket mounted within said tank, arms extending upwardly from said basket, and a cover for closing said tank; said cover having notches through which said arms operate; and means of adjusting said basket up and down within the tank without removing the cover and holding the basket rigidly in position against the pressure of the water and steam, substantially as specified.

MATHIAS FOERG.

Witnesses:
W. M. ESTES,
JAMES MCGEE.